United States Patent
Ohara et al.

(10) Patent No.: US 7,063,250 B2
(45) Date of Patent: Jun. 20, 2006

(54) COATING FORMING METHOD AND COATING FORMING MATERIAL, AND ABRASIVE COATING FORMING SHEET

(75) Inventors: Minoru Ohara, Hyogo (JP); Masahiko Mega, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 27 days.

(21) Appl. No.: 10/415,088

(22) PCT Filed: May 31, 2002

(86) PCT No.: PCT/JP02/05359

§ 371 (c)(1),
(2), (4) Date: Apr. 25, 2003

(87) PCT Pub. No.: WO02/097160

PCT Pub. Date: Dec. 5, 2002

(65) Prior Publication Data

US 2004/0091627 A1    May 13, 2004

(30) Foreign Application Priority Data

May 31, 2001    (JP)    .............................. 2001-165659

(51) Int. Cl.
B23K 35/12    (2006.01)
C25D 15/00   (2006.01)
(52) U.S. Cl. ................... 228/245; 228/246; 228/248.1; 205/109; 428/551
(58) Field of Classification Search .............. 228/245, 228/248.1; 205/109, 110; 428/551
See application file for complete search history.

(56) References Cited

U.S. PATENT DOCUMENTS

| | | | | |
|---|---|---|---|---|
| 4,647,546 | A * | 3/1987 | Hall et al. | 501/96.4 |
| 4,729,504 | A * | 3/1988 | Edamura | 228/122.1 |
| 4,937,042 | A * | 6/1990 | Perkins et al. | 419/8 |
| 5,122,182 | A * | 6/1992 | Dorfman et al. | 75/252 |
| 5,476,723 | A * | 12/1995 | Pagnon | 428/610 |
| 5,523,169 | A * | 6/1996 | Rafferty et al. | 428/551 |
| 5,702,574 | A * | 12/1997 | Foster et al. | 204/224 R |
| 6,187,071 | B1 * | 2/2001 | Andrews et al. | 51/309 |
| 6,706,319 | B1 * | 3/2004 | Seth et al. | 427/190 |
| 6,811,898 | B1 * | 11/2004 | Ohara et al. | 428/697 |
| 2003/0084894 | A1 * | 5/2003 | Sung | 125/12 |
| 2003/0132119 | A1 * | 7/2003 | Ohara et al. | 205/109 |

(Continued)

FOREIGN PATENT DOCUMENTS

JP    04-218698    8/1992

(Continued)

*Primary Examiner*—Lynne R. Edmondson
(74) *Attorney, Agent, or Firm*—Oblon, Spivak, McClelland, Maier & Neustadt, P.C.

(57) ABSTRACT

A brazing filler metal sheet is prepared. The brazing filler metal sheet includes a brazing filler metal layer, a sticking material layer, and a released paper. The brazing filler metal layer includes a brazing filler metal. A coating material layer is laminated on the brazing filler metal layer. The coating material layer includes a mixture of coating material particles and a binder. As the coating material particles, MCrAlY particles and abrasive particles are used. The coating material layer is then dried, and the brazing filler metal sheet is cut (step S4), and adhered to a rotor blade. The rotor blade is heated, to melt the brazing filler metal. The brazing filler metal diffuses due to the heat treatment holding process. A solidified layer is then formed by cooling. This solidified layer is subjected to blasting to allow the cubic boron nitride particles to protrude.

27 Claims, 5 Drawing Sheets

U.S. PATENT DOCUMENTS

2003/0183529 A1* 10/2003 Ohara et al. ................ 205/109
2004/0031205 A1* 2/2004 Ohishi ........................ 51/295
2004/0096318 A1* 5/2004 Ohara et al. ............. 415/173.4

FOREIGN PATENT DOCUMENTS

| | | |
|---|---|---|
| JP | 04-218698 A * | 8/1992 |
| JP | 7-185789 | 7/1995 |
| JP | 8-506872 | 7/1996 |
| JP | 9-504340 | 4/1997 |
| JP | 09-195067 | 7/1997 |
| JP | 10-030403 | 2/1998 |
| JP | 2000-345809 | 12/2000 |

* cited by examiner

FIG.2
(a) 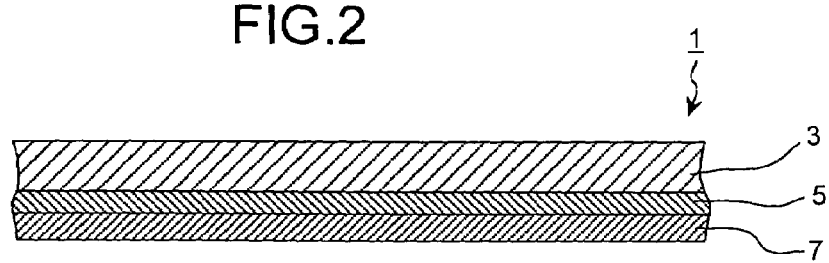
(b) 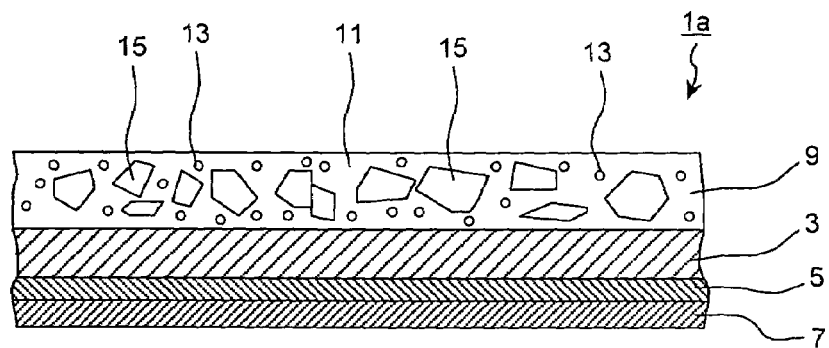
(c) 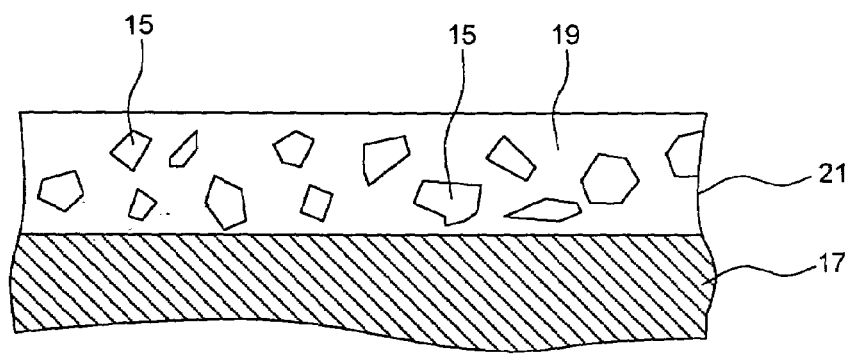
(d) 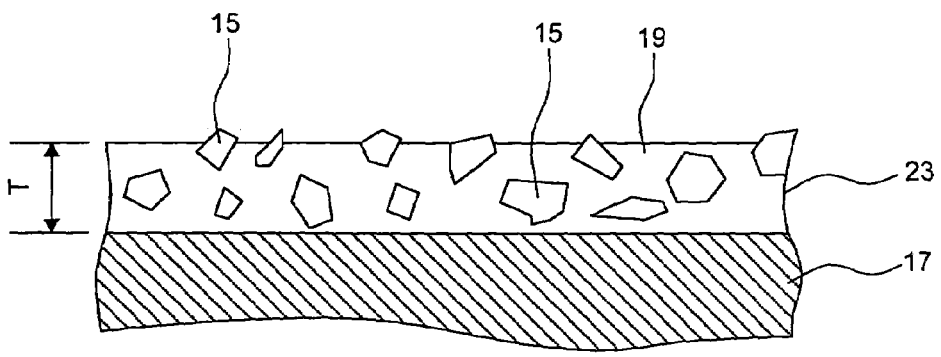

COATING FORMING METHOD AND COATING FORMING MATERIAL, AND ABRASIVE COATING FORMING SHEET

TECHNICAL FIELD

This invention relates to a method of forming an abrasive coating, an oxidation-resistant coating or the like on, for example, a rotor blade, a stator blade, or a shroud in a combustion engine (gas turbine, jet engine, and the like) or a steam turbine, a coating formation material, an abrasive coating formation sheet, and a rotor blade in a gas turbine on which an abrasive coating or the like is formed by this coating formation method, and a gas turbine using this rotor blade.

BACKGROUND ART

In a gas turbine, a predetermined clearance is provided between a tip of the rotor blade and the shroud that faces the tip of the rotor blade, so that the tip of the rotor blade and the shroud do not come in contact with each other during operation. If this clearance is too large, combustion gas leaks from the pressure surface side to the suction surface side of the rotor blade, thereby the combustion gas that can be used for driving the turbine decreases. As a result, the operation efficiency of the gas turbine decreases. Therefore, the clearance is set as small as possible, for suppressing the leak of the combustion gas as much as possible, to improve the performance of the gas turbine.

However, if the clearance is too small, in the initial stage of startup of the gas turbine, the tip of the rotor blade and the shroud may slide with each other, resulting from thermal expansion of the rotor blade, eccentricity of a turbine rotor, vibrations occurring in the whole gas turbine, or the like (a so-called initial sliding). When the gas turbine is operated for long time, the shroud exposed to the high-temperature gas gradually causes a thermal deformation, thereby the tip of the rotor blade and the shroud may slide with each other (a so-called secondary sliding).

In general, the shroud comprises a coating as a thermal insulation or antioxidation on the internal peripheral face thereof. For example, a thermal barrier coating (TBC) may be provided for thermal insulation, or an antioxidant coating consisting of McrAlY may be provided, where M is one or more of iron, nickel, and cobalt. These coatings often have high hardness, and hence, if the tip of the rotor blade and the internal peripheral face of the shroud slide with each other, the rotor blade may be largely damaged.

Japanese Patent Application Laid-Open Nos. 4-218698 and 9-504340, and U.S. Pat. No. 5,702,574 disclose a rotor blade having an abrasive coating, in which abrasive particles are dispersed in a matrix of McrAlY, which is an antioxidant material. In this rotor blade, for example, cubic boron nitride (CBN) or the like is used as the abrasive particles. The cubic boron nitride is a material having high hardness, and hence, if the rotor blade and the internal peripheral face of the shroud slide with each other, the abrasive particles comprising this cubic boron nitride polish the internal peripheral face of the shroud. As a result, appropriate clearance can be maintained between the rotor blade and the shroud.

This abrasive coating may be formed as follows. That is, abrasive particles are temporarily fixed to the rotor blade body, and a matrix is formed around the abrasive particles by electrodeposition. In other words, the matrix is formed by the growth of a deposit. Since the growth of the deposit requires time, this forming method has poor efficiency. Further, the formation of the matrix by the electrodeposition is generally expensive. Further, electrodeposition needs large-scale equipment, and it is difficult to newly build the electrodeposition equipment from a standpoint of environmental protection.

Japanese Patent Application Laid-Open No. 10-30403 discloses an abrasive coating formation method in which a matrix is formed by a thermal spraying method. The thermal spraying method is a method of allowing a metal layer to grow by injecting a molten metal, and has a feature in that it is highly efficient as compared with the electrodeposition method. In the thermal spraying method, however, when abrasive particles are temporarily fixed to the rotor blade body, the electrodeposition method is used. Therefore, it has the problems described above, and it is also difficult to accurately control the thickness of the matrix, and large-scale thermal spraying equipment is required. When abrasive particles such as cubic boron nitride are dispersed in the metal matrix by the thermal spraying method, since the abrasive particles are buried in the molten metal, it is necessary to remove the molten metal until the abrasive particles are exposed. However, it is difficult to expose the abrasive particles, and hence, it becomes difficult for the abrasive particles to polish the internal peripheral face of the shroud. Further, the metal matrix may be welded on the internal peripheral face of the shroud, to damage the rotor blade.

An antioxidant coating of the TBC or MCrAlY may be formed on the internal peripheral face of the shroud. These coatings are generally formed by the thermal spraying method, such as an atmospheric plasma spray (APS) method, a high velocity oxygen fuel (HVOF) method, a low pressure plasma spray (LPPS) method, or a detonation gun (D-GUN) method.

It is an object of the present invention to provide a coating formation method, a coating formation material, an abrasive coating formation sheet, a rotor blade in a gas turbine, on which an abrasive coating or the like is formed by the coating formation method, and a gas turbine using this rotor blade.

DISCLOSURE OF THE INVENTION

In order to achieve these objects, the coating formation method according to the present invention includes the following steps (1) to (3).

(1) a lamination step of laminating a brazing filler metal layer composed mainly of a brazing filler metal and a coating material layer composed mainly of a coating material, on the surface or the back of an object to be coated;

(2) a melting step of heating the laminated brazing filler metal layer and coating material layer to diffuse the coating material and the brazing filler metal, while allowing the brazing filler metal component to melt and infiltrate in the coating material; and (3) a fixing step of solidifying the molten brazing filler metal to fix it on the object to be coated.

In the coating formation method according to the present invention, a coating is formed by a so-called brazing. This method is cheap as compared with the plating or thermal spraying method, and does not require large-scale equipment, and hence there is little limitation on the application site.

In this case, it is desired that a coating parameter between the brazing filler metal and the coating material laminated at the lamination step be from 30:70 to 70:30 inclusive, as in the coating formation method according to the present invention. The brazing filler metal is reliably melted in the coating material at the melting step, by selecting the volume ratio in this manner.

As in the coating formation method according to the present invention, it is preferred that the brazing filler metal contains boron. Boron diffuses in the coating material at the melting step, to allow the solidifying point of the coating material to fall. Therefore, even when the coating material is heated at a relatively low temperature, the coating material melts, and once it melts, boron decreases to raise the melting point. As a result, a problem such as remelting hardly occurs in the actual operation.

As in the coating formation method according to the next invention, the brazing filler metal is preferably selected from materials having a melting point lower than the heat treatment temperature of the object to be coated. As a result, the melting step can be executed at the same time with the heat treatment of the object to be coated.

It is also preferred that the coating material layer to be used is one in which coating material particles diffuse in a binder, as in the coating formation method according to the next invention. Lamination of the coating material becomes easy by the binder. Since the binder volatilizes substantially completely at the melting step, it is suppressed that the quality of the coating deteriorates due to the binder remaining in the coating. If a volatile binder is used, it volatilizes easily at the melting step. Hence, the quality of the coating can be further improved, by reducing the quantity of the binder remaining in the coating. As the binder, one that volatilizes at a low temperature is preferable, and it is also desired to select the binder having a certain degree of strength (rigidity) of the coating material after the binder has dried.

As in the coating formation method according to the next invention, it is desired that a mass ratio between the binder and the coating material particles be from 15:85 to 2:1 inclusive. As a result, formation of the coating material layer becomes easy, and liquid dripping of the brazing filler metal at the melting step can be suppressed.

One example of a preferable coating material layer includes one comprising, as main component, MCrAlY particles and cubic boron nitride particles. An abrasive coating can be obtained by this coating material layer. In this abrasive coating, cubic boron nitride serves as abrasive particles, and MCrAlY becomes a matrix to fix the abrasive particles. The MCrAlY matrix also suppresses oxidation of the abrasive particles or the rotor blade material.

As in the coating formation method according to the next invention, it is desired that the volume ratio between the MCrAlY particles and the cubic boron nitride particles is from 1:2 to 2:1 inclusive, from a standpoint of consistence of improvement in the polishing ability and reliable fixation of the abrasive particles.

As in the coating formation method according to the next invention, if the abrasive coating is formed at the tip of the rotor blade of a gas turbine, the abrasive coating polishes the internal peripheral face of the opposite shroud, and hence a damage of the rotor blade by adhesion can be prevented.

In this coating formation method, it is desired to include an exposure step of removing a part of MCrAlY from the surface of the fixed coating material layer to expose the cubic boron nitride particles, as in the coating formation method according to the next invention.

The preferable exposure method is blasting, as in the coating formation method according to the next invention. As in the coating formation method according to the next invention, it is desired that in the blasting, an abrasive harder than the MCrAlY particles but softer than the abrasive particles be used. As a result, since MCrAlY can be removed efficiently from the formed abrasive coating, the abrasive particles can be exposed sufficiently.

In the blasting, as in the coating formation method according to the next invention, it is desired that the particle size of the abrasive is smaller than that of the abrasive particles and smaller than the space between the abrasive particles. However, if the particle size is made too small, the abrasive particles attack the holder of the abrasive particles to cause a dropout, and hence precautions should be taken regarding this point. As a result, dropout of the abrasive particles can be suppressed to a minimum, while sufficiently exposing the abrasive particles, and hence sufficient polishing performance can be exhibited from the initial stage.

Other examples of the preferred coating material layer include one composed mainly of the MCrAlY particles, as in the coating formation method according to the next invention. A coating having an oxidation resistance and an intergranular corrosion resistance obtained by this coating material layer can be preferably used in various members of a gas turbine where high-temperature gas circulates, more specifically, in a rotor blade, a stator blade, and a shroud, as in the coating formation method according to the next invention.

A coating formation coating material according to the next invention contains abrasive particles such as cubic boron nitride, Al2O3, SiC, or the like, a metal material having at least an oxidation resistance, and a binder. Since this coating formation coating material contains abrasive particles, a metal material, and a binder, the brazing filler metal is absorbed in the gap produced by volatilization of the binder, in the heat treatment at the time of coating formation. Thereby, dripping of the brazing filler metal to the surroundings can be considerably reduced, and hence the quality (uniformity of the coating thickness) after forming the coating on the object to be coated can be improved. As a result, since adjustment of the coating thickness after forming a coating can be kept to a minimum, the time and energy for coating formation can be reduced.

The object to be coated of the present invention includes a rotor blade and a shroud of a gas turbine. Since these objects to be coated are used in an atmosphere where high-temperature combustion gas is injected, the life thereof becomes short because of the reduced thickness due to oxidation. However, since the metal material contained in the coating formation coating material according to the present invention has an oxidation resistance, oxidation hardly occurs even in such an atmosphere. Therefore, the abrasive particles can be reliably held to demonstrate stable polishing performance, even in long-term use thereof. Further, it has an effect of reducing reduction of thickness of the base metal due to oxidation, and hence more stable operation of the gas turbine can be realized.

In a coating formation coating material according to the next invention, in the coating formation coating material, a ratio between the mass of the binder and the mass of the abrasive particles and the metal material is from 15:85 to 2:1 inclusive. As a result, the coating material layer can be formed easily, and dripping of the brazing filler metal at the melting step can be suppressed.

In a coating formation coating material according to the next invention, in the coating formation coating material, the metal material is MCrAlY. Since MCrAlY having an oxidation resistance is used as the metal material for forming a coating, even when a coating is formed on the rotor blade of a gas turbine used in a high-temperature oxidative atmosphere, the abrasive particles can be held for long time to maintain the polishing performance, and to protect the base metal from oxidation. As a result, stable operation of the gas turbine can be realized.

In a coating formation coating material according to the next invention, in the coating formation coating material, the volume ratio between the MCrAlY particles and the abrasive particles is from 1:2 to 2:1 inclusive. If the ratio of the cubic boron nitride, Al2O3, or SiC used as the abrasive particles is large, the content of MCrAlY decreases, and hence not only the oxidation resistance decreases, but also insufficient brazing filler metal easily occurs at the time of application. Further, holding of the abrasive particles becomes insufficient during brazing, thereby causing a relief of particles. On the other hand, if the ratio of MCrAlY is too large, the polishing ability of the abrasive coating may be insufficient. From these points of view, if the mass ratio is within the range described above, the occurrence of insufficient brazing filler metal can be prevented, and the workability can be improved. Further, since the oxidation resistance of the metal layer that holds the abrasive particles sufficiently is high, the particles can be stably held for long time, and dropout of the abrasive particles can be suppressed, thereby enabling reliable operation of the gas turbine.

In an abrasive coating formation sheet according to the next invention, a brazing filler metal and any one of the coating formation coating materials described above are laminated. In this abrasive coating formation sheet, since a binder is contained in the coating formation coating material, the brazing filler metal is sucked in the space where the binder volatilizes, in the heat treatment at the time of coating formation. As a result, liquid dripping at the time of coating formation can be considerably reduced, and hence the quality after the coating has been formed on the object to be coated can be improved. Since the adjustment after coating formation can be kept to a minimum, the time and energy for coating formation can be reduced. This abrasive coating formation sheet is adhered to the object to be coated, and then the abrasive coating can be formed only by heat-treating the object to be coated, and hence the abrasive coating can be formed very easily, as compared with the plating or thermal spraying method. Further, if a metal material having an oxidation resistance and an intergranular corrosion resistance is used as the coating formation coating material, even when the abrasive coating is formed on the rotor blade, the shroud and the like in the gas turbine, which are used in a high-temperature oxidative atmosphere, dropout of the abrasive particles can be suppressed to thereby maintain stable polishing performance. As a result, stable operation of the gas turbine can be realized.

Since the treatment prior to the heat treatment is completed only by adhering this abrasive coating formation sheet to the object to be coated, the work becomes very easy. Further, since it is a sheet form, it can be appropriately cut according to the shape of the object to be coated. Therefore, it can easily correspond to objects to be coated having various shapes.

In an abrasive coating formation sheet according to the next invention, in the abrasive coating formation sheet, the coating parameter between the brazing filler metal and the coating formation coating material is from 30:70 to 70:30 inclusive. By selecting the volume ratio, not only the coating formation coating material reliably melts at the melting step, but also the formed coating becomes strong.

In an abrasive coating formation sheet according to the next invention, in the abrasive coating formation sheet, boron is contained in the brazing filler metal. Since boron is contained, at the melting step, this boron diffuses in the coating formation coating material, to allow the solidifying point of the coating formation coating material to fall. Therefore, even when the coating formation coating material is heated at a relatively low temperature, the coating formation coating material melts. After boron diffuses, since the melting point of the coating formation coating material increases, the heat resistance of the brazing filler metal increases. As a result, even when the coating formation coating material is used in a high-temperature gas, such as in the rotor blade and the shroud of the gas turbine, the brazing filler metal can be used without remelting.

In an abrasive coating formation sheet according to the next invention, in the abrasive coating formation sheet, the brazing filler metal is selected from materials having a melting point lower than the heat treatment temperature of the object to be coated. As a result, the melting step is allowed to progress at the same time with the heat treatment of the object to be coated.

In an abrasive coating formation sheet according to the next invention, in the abrasive coating formation sheet, an adhesive layer is formed on the brazing filler metal. Therefore, so long as the abrasive coating formation sheet is prepared, the treatment prior to the heat treatment is completed only by adhering the abrasive coating formation sheet on the object to be coated, without requiring pasting and waiting for drying of the paste. As a result, time and energy for coating formation can be reduced.

In a rotor blade of a gas turbine according to the next invention, a coating is formed at the tip thereof by any one of the coating formation methods. Therefore, the abrasive coating can be formed very easily, as compared with the plating or thermal spraying method. As a result, the time required for coating formation can be considerably reduced, as compared with the coating formation method described above, and the production cost thereof can be reduced.

In a rotor blade of a gas turbine according to the next invention, any one of the abrasive coating formation sheets is adhered to the tip thereof. Therefore, the abrasive coating can be formed only by performing the necessary heat treatment on the rotor blade, and hence the abrasive coating can be formed very easily, as compared with the plating or thermal spraying method. As a result, the time required for coating formation can be considerably reduced, as compared with the coating formation method described above, and the production cost thereof can be reduced.

A gas turbine according to the next invention comprises: a compressor that compresses air to produce combustion air; a combustor that allows the combustion air produced by the compressor to react with a fuel, to generate a high-temperature combustion gas; and a turbine having a rotor blade driven by the combustion gas injected from the combustor to the rotor blade.

Therefore, so long as the heat treatment equipment is provided, the abrasive coating can be formed easily, and hence the equipment for coating formation becomes simple, as compared with the plating or thermal spraying method. Hence, even when there is no plating equipment near the gas turbine plant, the abrasive coating can be easily formed, if only a heating furnace used for the heat treatment is provided. Hence, the abrasive coating can be formed again on the rotor blade or the like, on the site. As a result, even if the abrasive coating is damaged, repair is easy.

BRIEF DESCRIPTION OF THE DRAWINGS

FIG. 2 is a block diagram for explaining various steps in the coating formation method in FIG. 1;

BEST MODE FOR CARRYING OUT THE INVENTION

An exemplary embodiment of the present invention are explained in detail below with reference to the accompanying drawings, however, the present invention is by no means limited only to this embodiment. The components in the embodiment include one that can be assumed easily by those skilled in the art, or substantially the same one.

Figure 1:
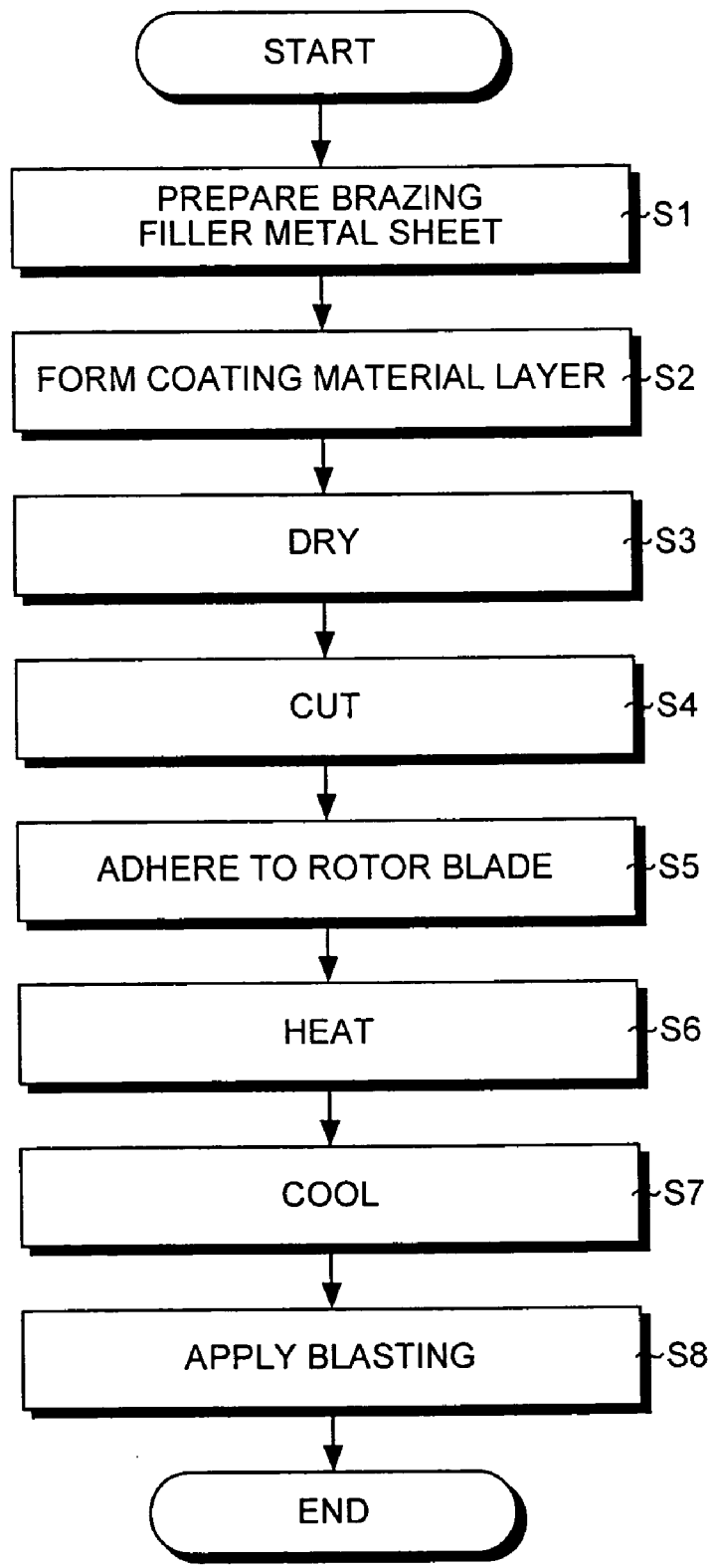
FIG. 1 is a flowchart that shows the coating formation method according to one embodiment of the present invention.

FIG. 1 is a flowchart of the coating formation method according to one embodiment of the present invention. This coating formation method is applied to a case in which a relatively simple apparatus (for example, a high vacuum heating furnace) is used, to form an abrasive coating at the tip of the rotor blade of a gas turbine. In this coating formation method, at first, a brazing filler metal sheet is prepared (step S1). FIG. 2(a) is an enlarged cross section of a part of this brazing filler metal sheet, which is comprehensively denoted by reference sign 1. This brazing filler metal sheet 1 comprises a brazing filler metal layer 3 on the upper side in the figure, an intermediate sticking material layer 5 as an adhesive layer, and a released paper 7 on the lower side. Needless to say, the brazing filler metal layer 3 comprises a brazing filler metal. If only the sticking material layer 5 and the lower side released paper 7 are provided, the released paper 7 is peeled off, and the brazing filler metal sheet 1 has only to be adhered on the object to be coated, and hence the work becomes very easy. The thickness of the brazing filler metal layer 3 is generally from 0.05 mm to 1.00 mm. The brazing filler metal layer 3 may be a single sheet or a bundle of two or three sheets. The intermediate sticking material layer 5, being an adhesive layer, and the lower released paper 7 may be provided according to need. When the intermediate sticking material layer 5 and the lower released paper 7 are not provided, the sheet 1 can be adhered on the object to be coated by pasting or the like, using a binder as a paste.

A preferable brazing filler metal includes one containing boron (B) of from about 2.75 to 3.50% by mass and composed mainly of nickel (Ni). This brazing filler metal generally contains chromium (Cr) of from about 6 to 8% by mass, silicon (Si) of from about 4 to 5% by mass, and iron (Fe) of from about 2.5 to 3.5% by mass. The brazing filler metal sheet 1 is preferably one that is not hardened with lapse of time, and a specific example of the brazing filler metal sheet 1 includes BNi-2 (JIS Standard), or the like.

The brazing filler metal sheet 1 is available in the market in the form such that the sticking material layer 5 and the released paper 7 are laminated on the brazing filler metal layer 3 in advance, and the brazing filler metal contains 83% by mass of nickel, 7% by mass of chromium, 3% by mass of boron, 4% by mass of silicon, and 3% by mass of iron.

Subsequently, a coating material layer 9 shown in FIG. 2(b) is formed on the brazing filler metal sheet 1 (step S2). It is also possible to form the coating material layer 9 and the sheet 1 separately, cut them from where they were formed, and later stick them together by a binder or the like. In order to prevent cracking such as cut in multiple steps, these are formed as a bilayer with the soft BNi-2, to thereby improve the sectility of the whole sheet.

The coating material layer 9 is formed by coating a mixture of coating material particles and a binder 11 on the surface of the brazing filler metal layer 3. At first, the mixture of the coating material particles and the binder 11 is poured on the brazing filler metal layer 3. Excessive mixture is scraped off, while spreading out the mixture in the form of sheet by a blade or the like, and coated in a predetermined thickness, taking the shrinkage allowance into consideration, when the mixture is dried. The coating material 9 is dried after coating (step S3), and generally air-dried for about one day. Because of the drying, the binder 11 volatilizes to some extent, whereby the thickness of the coating material layer 9 decreases.

The predetermined thickness of the coating material layer 9 after coating may be about from 0.10 to 1.00 mm, so that the thickness of the coating material layer 9 after drying becomes not larger than the coating thickness of the brazing filler metal sheet 1, as a standard. Therefore, it is preferred to appropriately change the thickness of the coating material layer 9 after coating the mixture, depending on the mixing ratio of the binder 11 and the component ratio of the coating material layer 9.

MCrAlY particles 13, being a metal material having an oxidation resistance and an intergranular corrosion resistance, are used as coating material particles, and cubic boron nitride particles 15 are used as the abrasive particles. Hereinafter, it is assumed that when it is simply referred to as coating material particles, this indicates both of these particles. The binder is mixed with the coating material particles and the abrasive particles, to become the coating formation coating material that forms the coating material layer 9.

MCrAlY is an alloy mainly composed of iron (Fe), nickel (Ni) or cobalt (Co), a chromium (Cr), aluminum (Al), and yttrium (Y), having the oxidation resistance and the intergranular corrosion resistance. It is preferred to increase the content of Cr and Al, to improve the intergranular corrosion resistance and the oxidation resistance, taking it into consideration that MCrAlY is diluted by the Ni brazing filler metal, after forming a coating. However, if the quantity of these, particularly, the quantity of Al is too much, the brazing property deteriorates, and hence precautions should be taken. In order to improve the oxidation resistance, the intergranular corrosion resistance, and the brazing property, Ta, Re, Hf, Si or the like can be added, in addition to Cr and Al.

It is necessary to bring impurities with respect to the brazing property, such as O and N, close to zero infinitely on the surface of the MCrAlY particles. As the MCrAlY, it is preferred to use one having the particle size in the range of from 10 to 100 μm at random, in order to increase the filling rate. However, if the particle size is too small, the surface area becomes too large, thereby disadvantageously increasing the amount of impurities such as O and N.

On the other hand, as the cubic boron nitride particles 15, one put on the market by General Electric company, De Beers industrial Diamonds, Showa Denko K. K., Sumitomo Electric Industries, Ltd. and the like can be used. The cubic boron nitride is classified in single crystal and polycrystal, and high purity products exist. It is possible to use the right one in the right place, but it becomes clear that one obtained by coating cubic boron nitride with TiN or the like has excellent brazing property. Coating on the cubic boron nitride improves the wettability between the cubic boron nitride and the brazing filler metal, and hence the cubic boron nitride particles 15 can be sufficiently buried in the brazing filler metal. Thereby, dropout of the cubic boron nitride particles 15 can be suppressed. As a result, the TBC layer or the like on the shroud can be shaved off stably, thereby preventing welding between the tip of the rotor blade and the shroud, and enabling highly reliable operation.

Further, one obtained by coating the cubic boron nitride with Co or Ni, or one obtained by coating the cubic boron nitride with TiN or a Ti compound may be used. It is desired to appropriately select these depending on the kinds of the MCrAlY particles forming the coating material layer 9.

For example, $Al_2O_3$, SiC, and the like may be used as the abrasive particles, instead of the cubic boron nitride particles 15. When $Al_2O_3$, SiC, or the like is used in order to improve the wettability with the brazing filler metal, it is preferred to use $Al_2O_3$ or SiC applied with coating. From a standpoint of improving the membrane-making with respect to $Al_2O_3$ and TiN, and the wettability with respect to the MCrAlY material, when $Al_2O_3$ is used as the abrasive particles, Co, Cr, Ni and the like can be mentioned as these coating materials. When SiC is used as the abrasive particles, AlN, TiN, $Al_2O_3$ and the like can be mentioned as the coating material used for suppressing the reaction with SiC and Cr during brazing.

The volume ratio of the volume $V_M$ of the MCrAlY particles 13 to the volume $V_C$ of the cubic boron nitride particles 15, $V_M:V_C$, is preferably from 30:70 to 70:30 inclusive. If the ratio of the cubic boron nitride particles 15 is large, percentage of voids in the brazing filler metal sheet 1 increases, and the amount of the binder also increases. As a result, insufficient brazing filler metal and deformation likely occur. If the percentage of the cubic boron nitride particles 15 exceeds 70%, that is, the volume ratio $V_M:V_C$ is smaller than 30:70, the density of the cubic boron nitride particles 15 is too large, and electric discharge machining from above the coating becomes difficult. Since the oxidation resistance also decreases, there is the possibility that the holding power for the cubic boron nitride particles 15 decreases to cause dropout of the cubic boron nitride particles 15. From this point of view, it is preferred to set the volume ratio $V_M:V_C$ to not smaller than 1:2, and it is particularly preferable that the percentage of the cubic boron nitride particles 15 be not larger than 60%, that is, the volume ratio $V_M:V_C$ be not smaller than 40:60, from a standpoint of cost. On the other hand, if the volume ratio $V_M:V_C$ exceeds 70:30, the polishing ability of the abrasive coating may be insufficient. From this point of view, it is more preferable to have the volume ratio $V_M:V_C$ of not larger than 2:1, and particularly preferable to have the volume ratio $V_M:V_C$ of not larger than 60:40. Therefore, the most preferable range of the volume ratio $V_M:V_C$ is from 40:60 to 60:40 inclusive. At the time of actual operation, since the specific gravities (densities) of the respective materials are known, the sheet 1 is prepared under mass control.

It is also known that the cubic boron nitride particle 15 has high hardness at high temperatures and excellent machinability, but disappears in a short period of time in a high-temperature oxidative atmosphere. Therefore, it is necessary to use it by mixing it with SiC, $Al_2O_3$, and the like having excellent long term stability. These volume ratios are also applicable, when $Al_2O_3$, TiN and the like are used, instead of the cubic boron nitride particles 15, or together with the cubic boron nitride particles 15.

Various kinds of binders can be used as the binder 11, but it is particularly preferable to use one that volatilizes at a low temperature. The volatile binder 11 volatilizes in the dry step and the melting step described later in detail, and hence hardly remains in the abrasive coating. Therefore, it does not adversely affect the quality of the abrasive coating. Further, after the volatile binder 11 volatilizes, a gap is formed. In the melting step described later, since the brazing filler metal is absorbed in this gap due to the capillary phenomenon, liquid dripping can be considerably reduced. As a result, degradation of the rotor blade due to the liquid dripping is suppressed, and a treatment for the liquid dripping (mainly application of stop-off) is hardly required, and hence time and energy for application can be improved.

Organic binders can be preferably used as the preferable volatile binder 11, and particularly, a cellulose binder is more preferable because of having excellent flowability of the brazing filler metal. When a binder in which a plasticizer is added to the binder is used, flexibility is added to the abrasive coating formation sheet 1a described later, thereby enabling improvement in the workability, such that the sheet becomes easy to cut, or the like, which is preferable.

The mass ratio $m_B:m_C$, of the mass ratio $m_B$ of the volatile binder 11 to the mass ratio $m_C$ of the coating material particles 13 and 15 is preferably from 15:85 to 2:1 inclusive. If the mass ratio $m_B:m_C$ is less than the lowest limit of the above range, there is the possibility that the coating of the mixture of the coating material particles 13 and 15 and the binder 11 becomes difficult. From this point of view, it is more preferable that the mass ratio $m_B:m_C$ be not smaller than 20:80 (1:4), and most preferable that the mass ratio $m_B:m_C$ be not smaller than 1:2. On the other hand, if the mass ratio $m_B:m_C$ exceeds the upper limit of the above range, liquid dripping likely occurs at the time of heat treatment of the object to be coated. From this point of view, it is more preferable that the mass ratio $m_B:m_C$ be not larger than 60:40, and most preferably, not larger than 40:60. Therefore, the preferable range of the mass ratio $m_B:m_C$ of the volatile binder 11 to the coating material particles 13 and 15 is from 20:80 to 40:60 inclusive.

The coating parameter between the brazing filler metal and the coating material is preferably from 30:70 to 70:30 inclusive. If this coating parameter is less than the lowest limit of the above range, the coating material does not infiltrate in the brazing filler metal at the melting step, thereby easily causing insufficient brazing filler metal. From this point of view, it is particularly preferable that the coating parameter be not smaller than 60:40. After the brazing filler metal sheet 1 has been formed, the sheet 1 is dried at a normal temperature, in order to facilitate the cutting operation, and volatilize the excessive binder. It is desired to dry the sheet for the entire day or longer in a thermostatic chamber, if possible, in which the temperature and humidity are controlled.

The brazing filler metal sheet 1 on which the coating material layer 9 is laminated (hereinafter referred to as an abrasive coating formation sheet 1a) is cut into a predetermined shape and size (step S4). The cutting means is not particularly limited, but since the abrasive coating formation sheet 1a has high brittleness, it is preferred to use a stencil and a ultrasonic cutter. The released paper 7 is peeled off from the abrasive coating formation sheet 1a cut into the predetermined shape and size, and adhered on the tip of the rotor blade, being the object to be coated (step S5).

Since the abrasive coating formation sheet 1a is cut into a blade shape, the majority thereof remains as unused waste pieces. Since expensive cubic boron nitride is contained in the abrasive coating formation sheet 1a, it is necessary to recover the cubic boron nitride. However, a coating for improving the brazing property is applied on the surface of the cubic boron nitride, and hence it is important to recover the cubic boron nitride without damaging this coating. Therefore, in recovering the cubic boron nitride, it is possible to recover only the cubic boron nitride by boiling and soaking the waste pieces of the abrasive coating formation sheet 1a in an NaOH solution having a concentration of about 10% for about 1 to 5 hours to dissolve the binder, subjecting it to ultrasonic cleaning in pure water, and then filtering, washing with pure water, classifying, and drying. Here, ultrasonic cleaning in pure water is performed for about 10 to 30 minutes, for example three times, or drying is performed for about one hour, at for example 120° C.

Prior to attaching the abrasive coating formation sheet 1a, it is preferred to apply pretreatment, such as blasting, or cleaning by a solvent such as trichloroethylene, acetone or the like, to the tip of the rotor blade. It is because the tip of the rotor blade, on which the coating is formed, becomes rough due to the pretreatment, and oils and fats in the coating formed portion is removed, and as a result, adherence between the coating and the tip of the rotor blade becomes excellent.

A hole for the cooling medium such as cooling air and cooling steam to gush out from the internal cooling passage may be provided at the tip of the rotor blade. Therefore, if this hole is closed when the abrasive coating formation sheet 1a is attached to the tip of the rotor blade, the cooling medium cannot gush out during the operation of the gas turbine, and hence cooling of the rotor blade may be insufficient. Therefore, the abrasive coating formation sheet 1a is attached, avoiding the portion of the hole, from which the cooling medium gushes out. However, if the diameter of the hole is small and there are many holes, it is difficult to avoid these holes. Further, prior to the heat treatment, the abrasive coating formation sheet 1a is easily cut, and hence it is difficult to ensure the hole in this sheet before attaching the sheet. Therefore, punching is possible after attaching the sheet, by electric discharge machining or the like. Punching by the electric discharge machining is possible, regardless of before or after the cubic boron nitride particles are exposed.

The abrasive coating formation sheet 1a is then heated together with the rotor blade body (step S6). A vacuum heating furnace is normally used for heating. The heating conditions are determined, taking into consideration the material of the rotor blade body and the kind of the brazing filler metal. For example, when the material of the rotor blade body is a base metal of the rotor blade (Ni group super alloy or the like), and the BNi-2 is used as the sheet 1 used for the abrasive coating formation sheet 1a, at first, the temperature of the vacuum heating furnace is raised from a room temperature to about 600° C. over 10 hours or more. Since the abrasive coating formation sheet 1a is heated, taking long time, to positively volatilize the binder 11 in the abrasive coating formation sheet 1a at a low temperature, the component in the binder 11 that is likely to expand by heat does not remain at a high temperature. As a result, lines due to thermal expansion do not occur, and hence the quality of the formed abrasive coating can be improved. It is desired that the degree of vacuum at this time be higher than $10^{-5}$ torr. Subsequently, the temperature is raised up to 1000° C. or higher for about 2 hours, and the abrasive coating formation sheet 1a is held in this state for a required period of time. As a result, not only almost all the binder 11 volatilizes from the coating material layer 9, but also a gap is created in the coating material layer 9 after the binder 11 has volatilized.

Since the melting point of the brazing filler metal is about 1000° C., the brazing filler metal melts due to heating at 1000° C. or higher. The brazing filler metal that becomes liquid form due to this heating, infiltrates into the gap in the coating material layer 9 due to the capillary phenomenon, and absorbed in this gap. Boron, being the brazing filler metal component, also diffuses in the MCrAlY particles 13 in the coating material layer 9. Since boron lowers the solidifying point of MCrAlY, MCrAlY becomes a half melted state, and easy to diffuse in the surrounding brazing filler metal.

Subsequently, the inside of the vacuum heating furnace is cooled to 500° C. or lower by introducing an argon gas or a nitrogen gas (step S7). Thereby, the strength required for the Ni alloy, being the base metal, can be obtained, and as shown in FIG. 2(c), a solidified layer 21 is formed, in which the cubic boron nitride particles 15 are dispersed in the MCrAlY matrix 19. Since boron disappears to some extent by holding the sheet at a controlled temperature of 1000° C. or higher, the melting point of the matrix 19 rises to a temperature at which there is no practical problem. By this heat history, the heat treatment (stabilizing treatment) required for increasing the strength of the rotor blade is executed. In other words, melting of the coating material and the heat treatment of the rotor blade are completed at the same time at the melting step, by selecting a brazing filler metal having a melting point lower than the heat treatment temperature of the rotor blade.

Generally, cubic boron nitride has a specific gravity lighter than that of the brazing filler metal, if the both materials are mixed beforehand, the cubic boron nitride particles 15 float in the surface layer in the liquid brazing filler metal, thereby causing unequal dispersion of the cubic boron nitride particles 15 in the solidified layer 21. Further, liquid dripping of the melted brazing filler metal easily occurs. In the preferred embodiment of the present invention, the brazing filler metal layer 3 and the coating material layer 9 are sequentially laminated on the tip 17 of the rotor blade, to mix these by the capillary phenomenon. Therefore, since being held by MCrAlY in the coating material layer 9, the cubic boron nitride particles 15 does not float up, thereby dispersion of the cubic boron nitride particles 15 becomes uniform, and liquid dripping of the brazing filler metal can be suppressed.

Subsequently, blasting is applied to the solidified layer 21 (step S8). In the blasting, abrasive blasting particles are sprayed onto the surface of the matrix 19. By this blasting, as shown in FIG. 2(d), the portion towards the surface of the matrix 19 is removed. Since the cubic boron nitride particles 15 are hardly removed by the blasting according to the present invention, the cubic boron nitride particles 15 protrude from the matrix 19 (a so-called "exposed"). In this manner, the abrasive coating 23 is completed. In FIG. 2(d), the boundary between the abrasive coating 23 and the tip 17 of the rotor blade is clearly drawn, but in the actual rotor blade, the boundary between these becomes ambiguous due to the dispersion at the time of heating.

In order to remove the portion towards the surface of the matrix 19 by blasting prior to the cubic boron nitride particles 15, it is preferred to use the abrasive blasting particles having hardness lower than that of the cubic boron nitride particles 15 but higher than that of the matrix 19. In other words, if it is assumed that the Vickers hardness of the matrix 19 is H1, the Vickers hardness of the cubic boron nitride particles 15 is H2, and the Vickers hardness of the abrasive blasting particles used for the blasting is H3, it is preferred that H1, H2, and H3 satisfy the relation expressed by the following expression (I):

$$H1 < H3 < H2 \qquad (1).$$

When MCrAlY is used for the cubic boron nitride particles 15 and the matrix 19, for example, $Al_2O_3$ particles can be used as the abrasive blasting particles.

If the diameter of the abrasive blasting particles is too large, the exposure of the cubic boron nitride particles 15 becomes insufficient. On the other hand, if the diameter of the abrasive blasting particles is too small, exposure at the base where the cubic boron nitride particles 15 are held becomes too much, thereby the cubic boron nitride particles 15 drop out from the coating material layer 9. Therefore, it is preferred to use abrasive blasting particles having a size smaller than the space between the cubic boron nitride particles 15, and a size such that the abrasive blasting particles does not attack the base where the cubic boron nitride particles 15 are held. In this example, micro blasting using $Al_2O_3$ particles having a mean particle size of 50 μm is used, but it is desired to appropriately select the diameter of the abrasive blasting particles to be used, based on the particle size of the cubic boron nitride particles 15 and spaces therebetween. For example, when the space between the cubic boron nitride particles 15 is large and the surface is rough, it is preferred to use a larger abrasive blasting particle. Further, in the abrasive coating, when $Al_2O_3$ and SiC are used in the abrasive particles, it is preferred to use $ZrO_2$, glass beads, and the like as the abrasive blasting particle.

Figure 3:
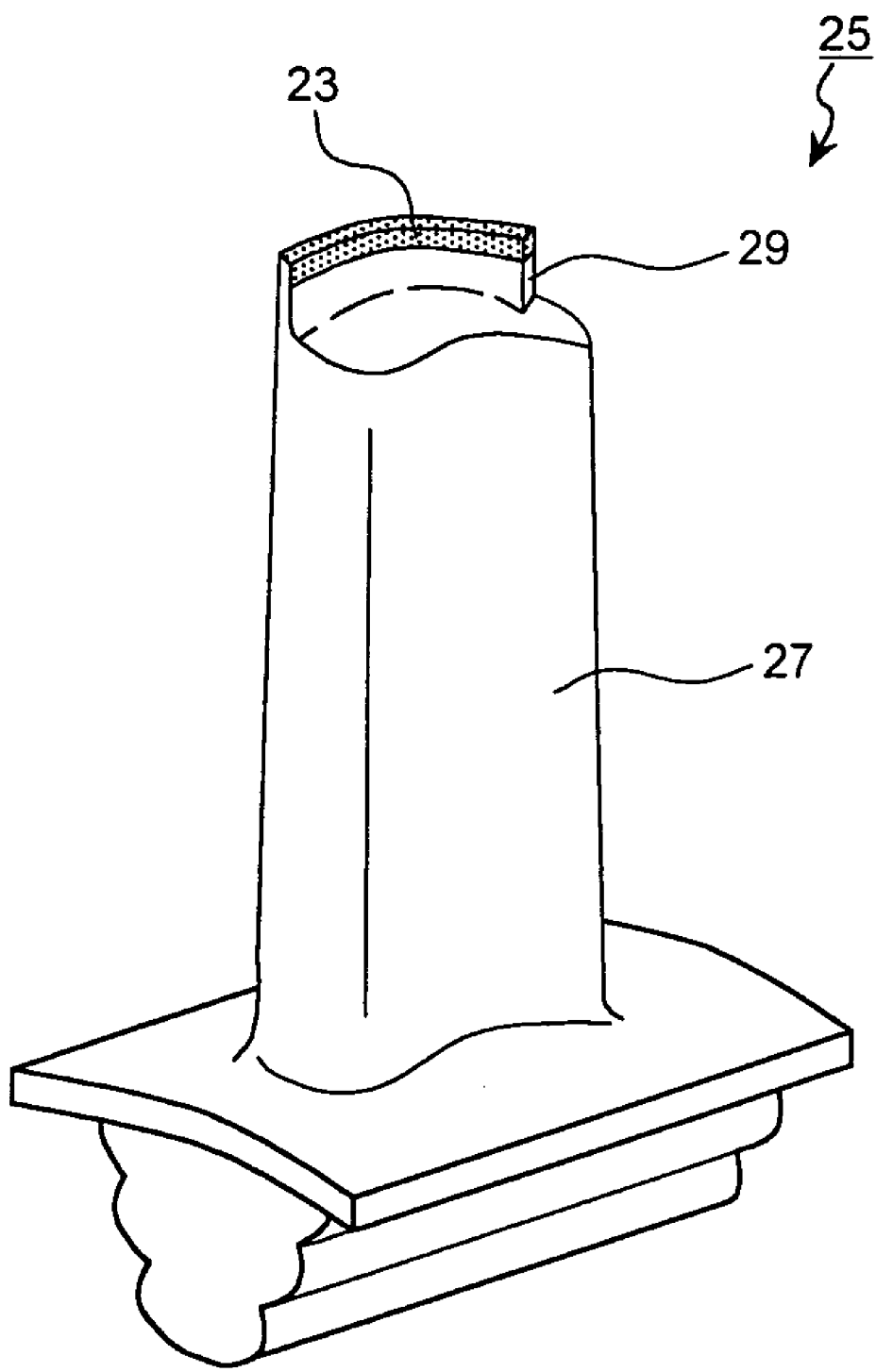
FIG. 3 is a perspective view that shows a rotor blade, on which an abrasive coating is formed by the forming method in FIG. 1.

FIG. 3 is a perspective view of a rotor blade 25, on which an abrasive coating 23 is formed by the forming method in FIG. 1. The rotor blade 25 comprises a body 27 and a protruding portion 29 extending from the end of the body 27, and the abrasive coating 23 is coated on the upper face of the protruding portion 29, being the tip of the rotor blade. Though not shown, the internal peripheral face of the shroud is located, facing the abrasive coating 23, in the gas turbine. When the rotor blade 25 and the shroud slide with each other, the internal peripheral face of the shroud is polished by the abrasive coating 23. A rotor blade having no protruding portion 29 may exist, but in this case, the abrasive coating can be formed at the tip of the rotor blade.

The mean particle size of the cubic boron nitride particles 15 is preferably from about 50 to 200 μm. If the mean particle size is less than 50 μm, the polishing ability of the abrasive coating 23 may be insufficient. From this point of view, it is particularly preferable that the mean particle size be not smaller than 80 μm. On the other hand, if the mean particle size exceeds 200 μm, not only the coating thickness of the abrasive coating 23 becomes too large, but also the oxidation resistance of the abrasive coating 23 becomes insufficient. From this point of view, in the case of the rotor blade of the gas turbine, it is particularly preferable that the mean particle size be not larger than 170 μm. Therefore, the most preferable range of the mean particle size is from 80 to 170 μm.

Figure 4:
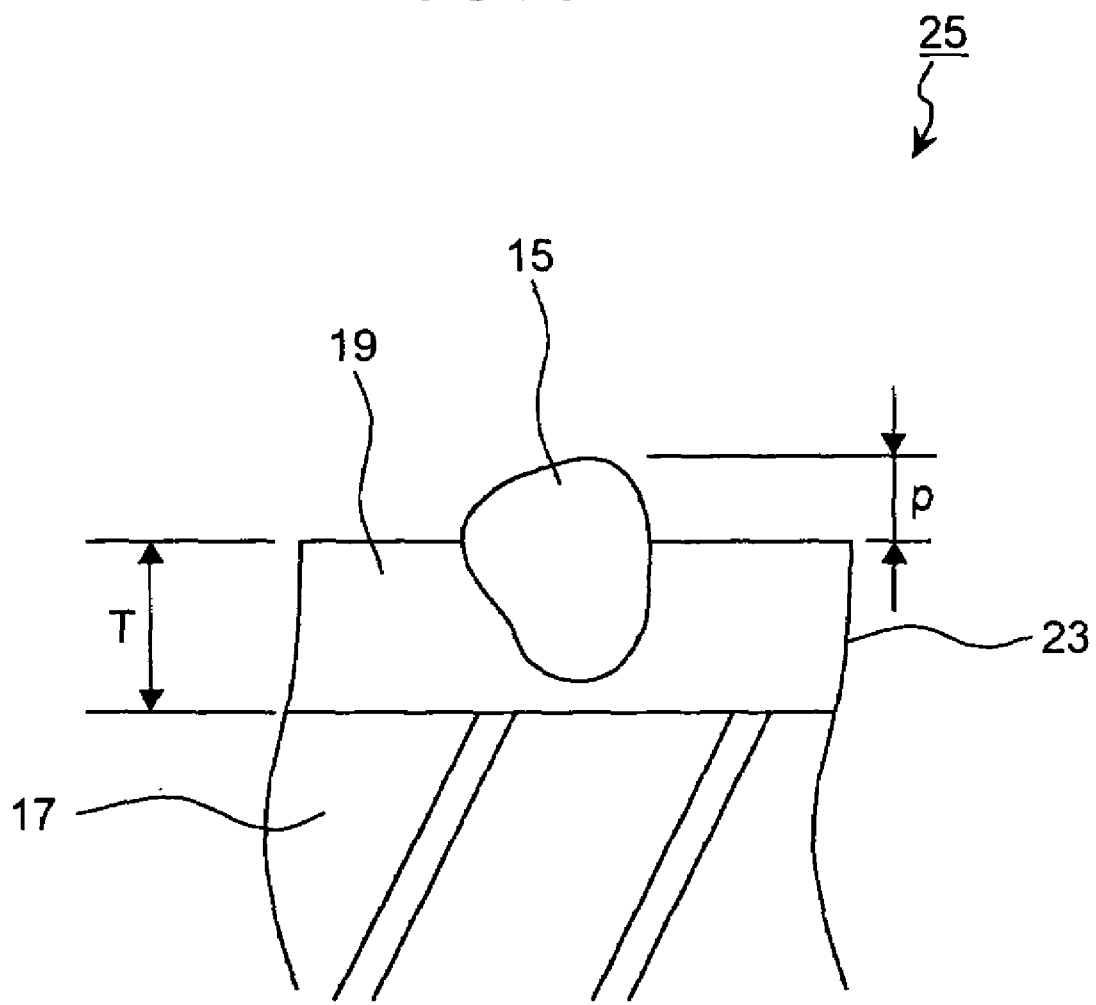
FIG. 4 is an enlarged cross section that shows a part of the rotor blade shown in FIG. 3.

FIG. 4 is an enlarged cross section of a part of the rotor blade 25 shown in FIG. 3. As described above, the cubic boron nitride particles 15 protrude from the matrix 19. In this figure, what is shown by two arrows p is a protrusion size of the cubic boron nitride particle 15. When it is assumed that the mean particle size of the cubic boron nitride particles 15 is D, and a mean value of the protrusion size p in all cubic boron nitride particles 15 protruding from the matrix 19 (that is, mean protrusion size) is P, the ratio of the mean protrusion size P to the mean particle size D is preferably from 25% to 70% inclusive. If this ratio is less than 25%, the polishing ability of the abrasive coating 23 may be insufficient. From this point of view, it is more preferable that the ratio be not smaller than 30%. On the contrary, if this ratio exceeds 70%, the cubic boron nitride particles 15 may often drop out from the matrix 19. From this point of view, it is more preferable that the ratio be not larger than 60%. Therefore, the most preferable range of the ratio is from 30 to 60%.

It is preferred that the thickness of the matrix 19 (the portion indicated by the duplex arrow T in FIG. 4) be not smaller than 50 μm. If the thickness of the matrix 19 is less than 50 μm, not only holding of the cubic boron nitride particles 15 in the abrasive coating 23 becomes insufficient, but also the distribution of the cubic boron nitride particles 15 cannot be arranged in a form of shark teeth, and hence the long-time high-temperature durability of the abrasive coating 23 decreases.

In this invention, the abrasive coating formation sheet 1a, being a brazing filler metal sheet 1 laminated with the coating material layer 9, is used. This is cut into a predetermined shape and attached to the object to be coated, and then heat treatment is executed with respect to the object to be coated, to thereby form the abrasive coating 23 (see FIG. 3) on the object to be coated. Subsequently, the abrasive coating 23 is subjected to the blasting, to expose the cubic boron nitride particles 15, so that the abrasive particles protrude from the abrasive coating 23. After being manufactured in this manner, the abrasive coating formation sheet 1a is cut into a predetermined shape and attached to the object to be coated. Thereafter, the abrasive coating can be formed only by applying the necessary heat treatment to the object to be coated. Since blasting is used for exposing the abrasive particles, the abrasive particles can be allowed to protrude easily. As a result, the abrasive coating can be formed very easily, as compared with the conventional plating or thermal spraying method.

For example, when the abrasive coating is to be formed at the tip of the rotor blade of a gas turbine, according to the coating formation method of the present invention, the application cost can be suppressed to from 1:3 to 1:4 as that of the conventional plating method. Further, the time required for the application can be shortened to less than 1:3. Since considerable effect of decreasing the application cost and reducing the application period can be obtained, it is very useful when the abrasive coating is formed on a large number of rotor blades. Further, since large-scale equipment as in the plating method is not necessary, the cost required for the investment in plant and equipment can be reduced. Since wastewater from plating is not generated as in the plating method, environmental burden can be considerably reduced.

Further, if heating equipment such as the vacuum heating furnace is prepared, the abrasive coating can be formed only by supplying the abrasive coating formation sheet 1a. Therefore, the heat treatment and the sheet preparation are not necessarily carried out at the same place. Hence, the freedom in application can be increased. For example, even in a gas turbine plant installed in a location where the application facility does not exist in the vicinity thereof, if only the heating equipment is provided and the abrasive coating formation sheet 1a is regularly supplied, recoating and the like can be performed on the site.

In the explanation, an example in which cubic boron nitride and MCrAlY are used as the coating material is shown, but only MCrAlY may be used as the coating material. In this case, the obtained coating is an oxidation resistant coating. This oxidation resistant coating is suitable for the rotor blade, the stator blade, or the shroud of a gas turbine.

Figure 5:
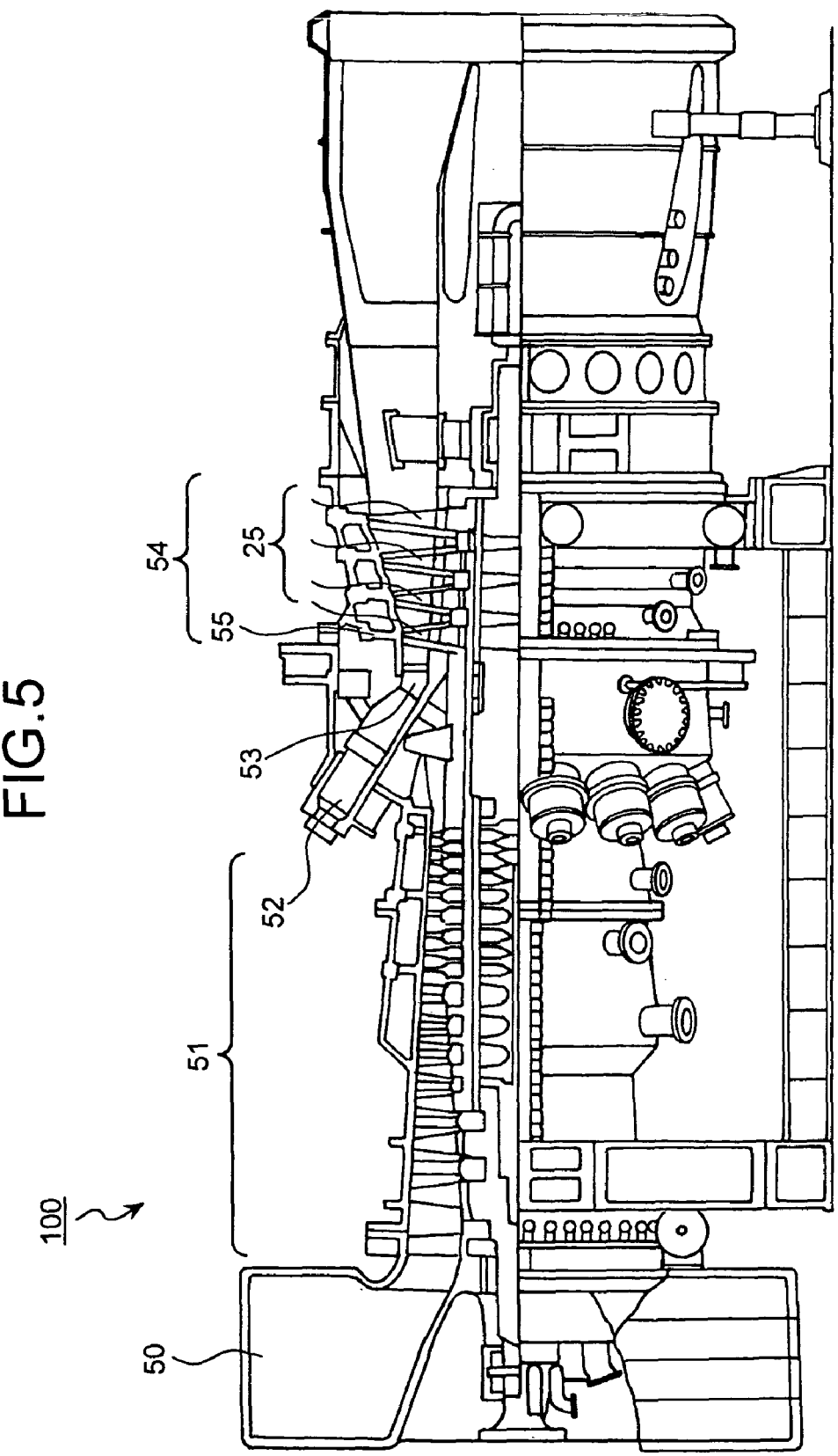
FIG. 5 shows a gas turbine having a gas turbine rotor blade, at the tip of which an abrasive coating is formed by the coating formation method according to the present invention.

FIG. 5 shows a gas turbine having a gas turbine rotor blade, at the tip of which an abrasive coating is formed by the coating formation method according to the present invention. The air taken in from an air intake 50 is compressed by a compressor 51 to become high temperature and high pressure compressed air, and is fed to a combustor 52. The combustor 52 supplies a gas fuel such as natural gas or the like, or a liquid fuel such as gas oil, light fuel oil or the like to the compressed air, to burn the fuel, to thereby generate high temperature and high pressure combustion gas. This high temperature and high pressure combustion gas is guided to a combustor tail pipe 53, and injected to a turbine 54.

The turbine 54 comprises a rotor blade 25 (see FIG. 3), at the tip of which an abrasive coating is formed by the coating formation method according to the present invention. The rotor blade 25 has a coating according to the present invention formed at the tip thereof. When the operation of a gas turbine 100 is started, a so-called initial sliding occurs due to thermal expansion of the rotor blade, and the tip of the rotor blade 25 may come in contact with the internal wall of a shroud 55. When a certain period of time has passed since starting the operation, the tip of the rotor blade 25 may come in contact with the internal wall of the shroud 55 due to the deformation of the shroud 55, to thereby cause a so-called secondary sliding. In either case, since the abrasive particles are firmly brazed at the tip of the rotor blade 25, by the coating formation method of the present invention, the coating of TBC or the like (not shown) formed on the internal wall of the shroud 55 can be shaved off. As a result, welding of the rotor blade 25 can be prevented, and the gas turbine 100 can be stably operated. It is preferred that cubic boron nitride is allowed to function with respect to the initial sliding, and SiC and $Al_2O_3$ having excellent long-term stability at high temperatures are allowed to function with respect to the secondary sliding. Therefore, it is more desirable to mix and use these, for ensuring the long-term reliability of the gas turbine.

The rotor blade 25 according to the present invention has a coating formed at the tip thereof by brazing, and hence abrasive particles such as cubic boron nitride and the like can be distributed in a form of shark teeth. Therefore, even if the abrasive particles on the surface drop out, the next abrasive particles will appear. Hence, the coating of TBC or the like formed on the internal wall of the shroud 55 can be shaved off stably, until the abrasive coating 23 (see FIG. 3) disappears. As a result, more reliable operation can be realized than the case of using a rotor blade, on which a coating is formed by the conventional plating or thermal spraying method.

The coating formation method of the present invention includes:
(1) a lamination step of laminating a brazing filler metal layer composed mainly of a brazing filler metal and a coating material layer composed mainly of a coating material, on the surface or the back of the object to be coated;
(2) a melting step of heating the laminated brazing filler metal layer and the coating material layer to diffuse the coating material and the brazing filler metal, while allowing the brazing filler metal component to melt and infiltrate in the coating material; and
(3) a fixing step of solidifying the molten brazing filler metal to fix it on the object to be coated, and a coating is formed by a so-called brazing. This method can be executed at a low cost, as compared with the plating or thermal spraying method, and does not require large-scale equipment. As a result, there is the effect that there is little limitation on the application site.

In the coating formation method according to the present invention, the coating parameter between the brazing filler metal and the coating material laminated at the lamination step is set to from 30:70 to 70:30 inclusive. Therefore, not only the brazing filler metal is reliably melted at the melting step, but also the formed coating is firm, thereby improving the property thereof.

In the coating formation method according to the present invention, since the brazing filler metal contains boron, boron diffuses in the coating material at the melting step, to allow the solidifying point of the coating material to fall. Therefore, even when the coating material is heated at a relatively low temperature, the coating material can be reliably melted, at a low cost.

In the coating formation method according to the present invention, a brazing filler metal having a melting point lower than the heat treatment temperature of the object to be coated is selected. As a result, the melting step can be executed at the same time with the heat treatment of the object to be coated. Hence, the work efficiency in forming the coating can be improved.

In the coating formation method according to the present invention, since the coating material layer, in which coating material particles are dispersed in the binder, is used, lamination of the coating material becomes easy by the binder. The binder substantially completely volatilizes at the melting step, and hence degradation of the coating resulting from the remaining binder in the coating can be suppressed.

In the coating formation method according to the present invention, the mass ratio between the binder and the coating material particles is from 15:85 to 2:1 inclusive. As a result, formation of the coating material layer becomes easy, and liquid dripping of the brazing filler metal at the melting step can be suppressed, thereby enabling improvement of the workability.

In the coating formation method according to the present invention, MCrAlY particles and cubic boron nitride particles are used as the main component. In the abrasive coating obtained by this coating material layer, cubic boron nitride serves as abrasive particles, and MCrAlY becomes a matrix to fix the abrasive particles. The MCrAlY matrix can suppress oxidation of the abrasive particles.

In the coating formation method according to the present invention, the volume ratio between the MCrAlY particles and the cubic boron nitride particles is from 1:2 to 2:1 inclusive. Therefore, the polishing ability of the abrasive coating is improved and the abrasive particles can be reliably fixed.

In the coating formation method according to the present invention, since the abrasive coating is formed at the tip of the rotor blade of a gas turbine, cubic boron nitride in the abrasive coating polishes the internal peripheral face of the opposite shroud, and hence a damage of the rotor blade can be prevented.

In the coating formation method according to the present invention, an exposure step of removing a part of MCrAlY from the surface of the fixed coating material layer to expose the cubic boron nitride particles is included. Further, in the coating formation method according to the present invention, blasting is used at the exposure step of exposing the cubic boron nitride particles. As a result, exposure of the cubic boron nitride particles can be appropriately performed.

In the coating formation method according to the present invention, in the blasting, an abrasive harder than the MCrAlY particles but softer than the abrasive particles is used. As a result, since MCrAlY can be removed efficiently from the formed abrasive coating, the abrasive particles can be exposed sufficiently.

In the coating formation method according to the present invention, in the blasting, an abrasive having a particle size smaller than the particle size of the abrasive particles and smaller than the spaces between the abrasive particles. As a result, since dropout of the abrasive particles can be suppressed to a minimum, while sufficiently exposing the abrasive particles, sufficient polishing performance can be exhibited from the initial stage.

In the coating formation method according to the present invention, other examples of preferable coating material layers include one composed mainly of the MCrAlY particles. An oxidation resistant coating obtained by this coating material layer can be preferably used in various members of a gas turbine where high-temperature gas circulates, more specifically, in a rotor blade, a stator blade, and a shroud, as in the coating formation method according to the next invention.

In the coating formation method according to the present invention, since abrasive particles, a metal material having at least an oxidation resistance, and a binder are contained, the brazing filler metal is absorbed in the gap produced by volatilization of the binder, in the heat treatment at the time of coating formation. Thereby, liquid dripping of the brazing filler metal can be considerably reduced, and hence the quality after forming the coating on the object to be coated can be improved. Further, since the metal material has the oxidation resistance, oxidation hardly occurs even in a high temperature combustion gas atmosphere in which the rotor blade of the gas turbine is used. As a result, the abrasive particles can be reliably held, and stable polishing performance can be exhibited even in long-term use, and a reduced thickness due to oxidation of the base metal can be prevented. Hence, more stable operation of the gas turbine can be realized.

In the coating formation coating material according to the present invention, in the coating formation coating material, a ratio between the mass of the binder and the mass of the abrasive particles and the metal material is from 15:85 to 2:1 inclusive. As a result, the coating material layer can be formed easily, and liquid dripping at the melting step can be suppressed.

In the coating formation coating material according to the present invention, the metal material contained in the coating formation coating material is MCrAlY. Since MCrAlY having an oxidation resistance and an intergranular corrosion resistance is used, even when a coating is formed on the rotor blade of a gas turbine used in a high-temperature oxidative atmosphere, the abrasive particles can be held for long time to maintain the polishing performance. As a result, stable operation of the gas turbine can be realized.

In the coating formation coating material according to the present invention, in the coating formation coating material, the volume ratio between the MCrAlY particles and the abrasive particles is from 1:2 to 2:1 inclusive. Therefore, the occurrence of insufficient brazing filler metal can be prevented, and the workability can be improved. Further, since abrasive particles can be sufficiently fixed, dropout of the abrasive particles can be suppressed, thereby enabling reliable operation of the gas turbine.

In the abrasive coating formation sheet according to the present invention, a brazing filler metal and any one of the coating formation coating materials described above are laminated. Therefore, after this abrasive coating formation sheet is attached to the object to be coated, the abrasive coating can be formed only by heat-treating the object to be coated. Hence, the abrasive coating can be formed considerably easily, as compared with the plating or thermal spraying method. Further, since a treatment prior to the heat treatment is completed only by attaching the abrasive coating formation sheet to the object to be coated, the operation becomes very easy. Further, since it is a sheet form, it can be appropriately cut according to the shape of the object to be coated. Therefore, it can easily correspond to objects to be coated having various shapes.

In the abrasive coating formation sheet according to the present invention, in the abrasive coating formation sheet, the coating parameter between the brazing filler metal and the coating formation coating material is set to from 30:70 to 70:30 inclusive. Therefore, not only the coating formation coating material reliably melts at the melting step, but also the formed coating becomes firm.

In the abrasive coating formation sheet according to the present invention, in the abrasive coating formation sheet, boron is contained in the brazing filler metal. Since boron is contained, this boron diffuses in the coating formation coating material at the melting step, to allow the solidifying point of the coating formation coating material to fall. Therefore, even when the coating formation coating material is heated at a relatively low temperature, the coating formation coating material melts. After boron diffuses, since the melting point of the coating formation coating material increases, the heat resistance of the brazing filler metal increases. As a result, even when the coating formation coating material is used in a high-temperature gas, such as in the rotor blade and the shroud of a gas turbine, the brazing filler metal can be used without melting.

In the abrasive coating formation sheet according to the present invention, in the abrasive coating formation sheet, the brazing filler metal is selected from materials having a melting point lower than the heat treatment temperature of the object to be coated. As a result, the melting step is allowed to progress at the same time with the heat treatment of the object to be coated.

In the abrasive coating formation sheet according to the present invention, in the abrasive coating formation sheet, an adhesive layer is formed on the brazing filler metal. Therefore, so long as the abrasive coating formation sheet is prepared, the treatment prior to the heat treatment is completed only by adhering the abrasive coating formation sheet to the object to be coated, without requiring pasting and waiting for drying of the paste. As a result, time and energy for coating formation can be reduced.

In the rotor blade of a gas turbine according to the present invention, an abrasive coating is formed at the tip thereof by any one of the coating formation methods. Therefore, the abrasive coating can be formed very easily, as compared with the plating or thermal spraying method. As a result, the time required for coating formation can be considerably reduced, as compared with the coating formation method described above, and the production cost thereof can be reduced.

In the rotor blade of a gas turbine according to the present invention, any one of the abrasive coating formation sheets is adhered to the tip thereof. Therefore, the abrasive coating can be formed only by performing the necessary heat treatment on the rotor blade, and hence the abrasive coating can be formed considerably easily, as compared with the plating or thermal spraying method. As a result, the time required for coating formation can be considerably reduced, as compared with the coating formation method described above, and the production cost thereof can be reduced.

In the gas turbine according to the present invention, a turbine driven by a combustion gas injected from the combustor comprises the rotor blade. Therefore, if only heat treatment equipment is provided, an abrasive coating can be easily formed on the rotor blade. Hence, even when there is no plating equipment near the operation site of the gas turbine, the abrasive coating can be easily formed, so long as a heating furnace used for heat treatment is equipped. As a result, since the abrasive coating can be formed again on the rotor blade on the site, repair of the rotor blade is easy.

INDUSTRIAL APPLICABILITY

The coating formation method, the coating formation material, the abrasive coating formation sheet, the rotor blade of the gas turbine, on which an abrasive coating or the like is formed by the coating formation method, and the gas turbine using this rotor blade according to the present invention are useful in forming an abrasive coating, an oxidation resistant coating or the like, which is formed on a member such as a rotor blade, a stator blade, or a shroud in a combustion engine (gas turbine, jet engine, and the like) and a steam turbine, and is suitable for easily forming these coatings.

The invention claimed is:

1. A coating formation method comprising:
    a lamination step of laminating a brazing filler metal layer and a coating material layer on a surface of an object to be coated, the brazing filler metal layer being composed essentially of a brazing filler metal, and the coating material layer comprising a coating material having abrasive particles;
    a melting step of heating the laminated brazing filler metal layer and the coating material layer to allow at least a part of the coating material to melt, while diffusing the brazing filler metal in the coating material; and
    a fixing step of solidifying the melted coating material to fix it on the object to be coated.

2. The coating formation method according to claim 1, wherein a coating parameter between the brazing filler metal and the coating material laminated at the lamination step is from 30:70 to 70:30 inclusive.

3. The coating formation method according to claim 1, wherein the brazing filler metal component diffused in the coating material is boron.

4. The coating formation method according to claim 1, wherein the brazing filler metal is selected from materials having a melting point lower than a heat treatment temperature of the object to be coated.

5. The coating formation method according to claim 1, wherein the coating material layer is one in which coating material particles diffuse in a binder.

6. The coating formation method according to claim 5, wherein a mass ratio between the binder and the coating material particles is from 15:85 to 2:1 inclusive.

7. A coating formation method comprising:
    a lamination step of laminating a brazing filler metal layer and a coating material layer on a surface of an object to be coated, the brazing filler metal layer being composed essentially of a brazing filler metal, and the coating material layer being composed essentially of a coating material;
    a melting step of heating the laminated brazing filler metal layer and the coating material layer to allow at least a part of the coating material to melt, while diffusing the brazing filler metal in the coating material; and
    a fixing step of solidifying the melted coating material to fix it on the object to be coated,
    wherein the coating material layer has MCrAlY particles and abrasive particles, the abrasive particles being selected from a group consisting of cubic boron nitride, $Al_2O_3$, and TiN.

8. The coating formation method according to claim 7, wherein a volume ratio between the MCrAlY particles and the abrasive particles is from 1:2 to 2:1 inclusive.

9. The coating formation method according to claim 7, wherein the object to be coated is a tip of a rotor blade of a gas turbine.

10. The coating formation method according to claim 7, further comprising:
    an exposure step, which is executed after the fixing step, of removing a part of MCrAlY from a surface of the fixed coating material layer to expose the abrasive particles.

11. The coating formation method according to claim 10, wherein the exposure step is carried out by blasting.

12. The coating formation method according to claim 11, wherein in the blasting, an abrasive harder than the MCrAlY particles but softer than the abrasive particles is used.

13. The coating formation method according to claim 12, wherein a particle size of the abrasive is smaller than a particle size of the abrasive particles and smaller than a space between the abrasive particles.

14. The coating formation method according to claim 1, wherein the coating material layer comprises MCrAlY.

15. The coating formation method according to claim 14, wherein the object to be coated is a rotor blade, a stator blade, or a shroud of a gas turbine.

16. A method of providing a clearance between a blade and a shroud, comprising:
    laminating a brazing layer and a coating layer on a surface of one of the blade and the shroud, the coating layer comprising abrasive particles;
    heating the laminated brazing layer and coating layer to allow at least a portion of the brazing layer to diffuse into the coating layer;
    cooling the heated laminated brazing layer and coating layer to form an abrasive layer; and
    moving the blade relative to the shroud to remove material with the abrasive layer disposed on the one of the blade and the shroud from the other of the blade and the shroud.

17. The method according to claim 16, wherein the abrasive layer is formed on the blade.

18. The method according to claim 17, wherein the blade comprises a rotor blade of a turbine.

19. The method according to claim 18, wherein moving comprises rotating the rotor blade about an axis.

20. The method according to claim 16, wherein the abrasive particles comprise one of cubic boron nitride, $Al_2O_3$, and TiN.

21. The method according to claim 16, wherein the coating layer comprises a coating material.

22. The method according to claim 21, wherein the abrasive particles comprise one of cubic boron nitride, $Al_2O_3$, and TiN.

23. The method according to claim 22, wherein the coating material comprises MCrAlY.

24. The method according to claim 23, further comprising:
    exposing the abrasive particles on the one of the blade and the shroud.

25. The method according to claim 24, further comprising:
    blasting the abrasive layer to expose the abrasive particles on the one of the blade and the shroud.

26. A brazed layer, comprising:
    abrasive particles comprising at least one of cubic boron nitride, $Al_2O_3$, and TiN;
    a metal material resistant to oxidization; and
    a binder,
    wherein a ratio between a mass of the binder and a mass of the abrasive particles and the metal material is from 15:85 to 2:1 inclusive, wherein the metal comprises MCrAlY.

27. The brazed layer according to claim 26, wherein a volume ratio between MCrAlY particles and the abrasive particles is from 1:2 to 2:1 inclusive.

* * * * *